US010986603B2

(12) United States Patent
Johansson et al.

(10) Patent No.: US 10,986,603 B2
(45) Date of Patent: Apr. 20, 2021

(54) METHOD OF CLUSTERING TRANSPORTATION UNITS, TRANSPORTATION UNIT AND COMPUTER PROGRAM

(71) Applicant: Sony Corporation, Tokyo (JP)

(72) Inventors: Magnus Johansson, Dosjebro (SE); Peter Ljung, Lund (SE); Johan Wadman, Lund (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/613,632

(22) PCT Filed: May 18, 2018

(86) PCT No.: PCT/IB2018/053520
§ 371 (c)(1),
(2) Date: Nov. 14, 2019

(87) PCT Pub. No.: WO2018/215899
PCT Pub. Date: Nov. 29, 2018

(65) Prior Publication Data
US 2020/0305108 A1    Sep. 24, 2020

(30) Foreign Application Priority Data
May 22, 2017    (EP) .................................... 17172177

(51) Int. Cl.
H04W 64/00    (2009.01)
G06Q 10/08    (2012.01)
(Continued)

(52) U.S. Cl.
CPC ........ *H04W 64/00* (2013.01); *G06Q 10/0833* (2013.01); *G16Y 20/10* (2020.01); *G16Y 40/60* (2020.01)

(58) Field of Classification Search
CPC ... H04W 64/00; G06Q 10/0833; G06Q 10/08; G06Q 10/087; G16Y 20/10; G16Y 40/60; H04L 69/18; H04L 67/12; G06K 17/0029
(Continued)

(56) References Cited

U.S. PATENT DOCUMENTS

2005/0093703 A1    5/2005 Twitchell
2005/0258955 A1    11/2005 Gloekler et al.
(Continued)

FOREIGN PATENT DOCUMENTS

WO    2016005675 A1    1/2016

OTHER PUBLICATIONS

International Search Report and Written Opinion from corresponding International Application No. PCT/IB2018/053520, dated Aug. 8, 2018, 10 pages.

*Primary Examiner* — Ojiako K Nwugo
(74) *Attorney, Agent, or Firm* — Tucker Ellis LLP

(57) ABSTRACT

The disclosure relates to a method for clustering transportation units in a distribution chain. The method makes use of the situation where many transportation units, such as IoT devices, are loaded in a confined space in which the transportation units have different or limited connectivity capabilities depending on radio environment and possibly also on device hardware capabilities. The method comprising respective transportation unit; sharing its identity; receiving and storing the identity of at least one other transportation unit; transmitting its identity and the stored identity of the at least one other transportation unit to an external processing unit; and clustering, at the external processing unit, the transportation units based on the transmitted identities. The disclosure also relates to a transportation unit and to computer program products.

14 Claims, 3 Drawing Sheets

(51) Int. Cl.
*G16Y 20/10* (2020.01)
*G16Y 40/60* (2020.01)

(58) Field of Classification Search
USPC .................................................. 340/539.16
See application file for complete search history.

(56) References Cited

U.S. PATENT DOCUMENTS

2017/0127337 A1   5/2017  Daragon et al.
2017/0308097 A1*  10/2017 Switkes .................. H04L 67/12
2019/0179339 A1*  6/2019  Kim ....................... G08G 1/162

* cited by examiner

| d0 | Id(s) | S1 | S2 |
|---|---|---|---|
| t0 | d1, d2 | Y | N |
| t1 | d1, d2 | Y | N |
| t2 | d1, d2 | Y | N |
| t3 | d1, d2 | Y | N |
| t4 | d1, d2 | Y | N |
| t5 | d1, d2 | N | N |
| t6 | d1, d2, d3 | N | N |
| t7 | d1, d2, d3 | N | N |
| t8 | d3, d4 | N | N |
| t9 | d3, d4 | N | N |
| t10 | d4 | N | N |
| t11 | d4 | N | N |

| d1 | Id(s) | S1 | S2 |
|---|---|---|---|
| t0 | d0, d2 | Y | Y |
| t1 | d0, d2 | Y | Y |
| t2 | d0, d2 | Y | Y |
| t3 | d0, d2 | Y | Y |
| t4 | d0, d2 | Y | Y |
| t5 | d0, d2 | Y | Y |
| t6 | d0, d2, d3 | Y | Y |
| t7 | d0, d2, d3 | Y | Y |
| t8 | | | |
| t9 | | | |
| t10 | | | |
| t11 | | | |

| d2 | Id(s) | S1 | S2 |
|---|---|---|---|
| t0 | d0, d1 | Y | N |
| t1 | d0, d1 | Y | N |
| t2 | d0, d1 | Y | N |
| t3 | d0, d1 | Y | N |
| t4 | d0, d1 | Y | N |
| t5 | d0, d1 | Y | N |
| t6 | d0, d1, d3 | Y | N |
| t7 | d0, d1, d3 | Y | N |
| t8 | | | |
| t9 | | | |
| t10 | | | |
| t11 | | | |

| d3 | Id(s) | S1 | S2 |
|---|---|---|---|
| t0 | | | |
| t1 | | | |
| t2 | | | |
| t3 | | | |
| t4 | | | |
| t5 | | | |
| t6 | d0, d1, d2 | N | Y |
| t7 | d0, d1, d2 | N | Y |
| t8 | d0, d4 | N | Y |
| t9 | d0, d4 | N | Y |
| t10 | | | |
| t11 | | | |

| d4 | Id(s) | S1 | S2 |
|---|---|---|---|
| t0 | | | |
| t1 | | | |
| t2 | | | |
| t3 | | | |
| t4 | | | |
| t5 | | | |
| t6 | | | |
| t7 | | | |
| t8 | d0, d3 | Y | Y |
| t9 | d0, d3 | Y | Y |
| t10 | d0 | Y | Y |
| t11 | d0 | Y | Y |

| | Cluster (c0) | S1 | S2 |
|---|---|---|---|
| t0 | d0, d1, d2 | Y | Y |
| t1 | d0, d1, d2 | Y | Y |
| t2 | d0, d1, d2 | Y | Y |
| t3 | d0, d1, d2 | Y | Y |
| t4 | d0, d1, d2 | Y | Y |
| t5 | d0, d1, d2 | Y | Y |
| t6 | d0, d1, d2, d3 | Y | Y |
| t7 | d0, d1, d2, d3 | Y | Y |
| t8 | d0, d3, d4 | Y | Y |
| t9 | d0, d3, d4 | Y | Y |
| t10 | d0, d4 | Y | Y |
| t11 | d0, d4 | Y | Y |

METHOD OF CLUSTERING TRANSPORTATION UNITS, TRANSPORTATION UNIT AND COMPUTER PROGRAM

FIELD OF INVENTION

The invention relates to a method for providing tracking capabilities in a distribution chain. The invention also relates to a transportation unit. The invention also relates to computer program products.

TECHNICAL BACKGROUND

Today, there exist a number of both outdoor and indoor location and sensor data tracking solutions.

In outdoor applications one may use 5G for cloud communication and GPS for location information. In indoor applications one may use Bluetooth or Wi-Fi gateways for cloud communication and indoor positioning for location information.

It is also conceivable to use mobile Wi-Fi gateways (indoor or outdoor) for cloud communication and location information.

In application related to transportation trays which are loaded on a trailer, one may have so-called IoT devices (Internet of Things devices) attached to each transportation tray.

At different positions in the transportation chain, the tray may be indoor and have access to Wi-Fi gateways and indoor location, the tray may be outside and have access to 5G and GPS, and the tray may be loaded on a trailer with none or limited access to 5G and none or limited access to GPS and no access to mobile or static Wi-Fi gateways.

The IoT devices loaded on a trailer is in a new environment with different capabilities depending on e.g. location inside the trailer. Some IoT devices may have no cloud access. Some IoT devices may have access to cloud via 5G. Some IoT devices may have access to cloud via a gateway using an application software on a mobile phone. Some IoT devices may have access to GPS and some may not have access to GPS.

This makes tracking of the devices and ultimately the tracking of the trays and the goods on the trays difficult.

To complicate the situation further, tracking is commonly also associated with the use of sensors detecting physical parameters, such as humidity, temperature, etc., which physical parameters may have an effect on the goods or result from a change in the properties of the goods. Additionally, different IoT devices may have a different subset of sensors depending on hardware capabilities and/or malfunctioning sensors.

One method to take into account that the different IoT devices may have or may not have 5G connectivity, is to use so called share cloud connectivity using mesh based protocols. This would allow one IoT device with no 5G to communicate through another IoT device with 5G connectivity. However, this method is associated with problems; allowing a plurality of devices to communication via a single device may cause the battery of the single device to drain quickly. Moreover, this method is based on that every tray is provided with a complete set of sensors and the method does not provide any solution to the problem of malfunctioning sensors.

SUMMARY OF INVENTION

It is an object of the invention to provide a method for clustering transportation units in a distribution chain, which method addresses one or more of the problems stated above.

This object has been achieved by a method for clustering transportation units in a distribution chain, the method comprising:

providing a plurality of transportation units, wherein each transportation unit comprises a communication module and a memory;

the method further comprising respective transportation unit
  sharing its identity via the communication module,
  receiving, via the communication module, the identity of at least one other transportation unit;
  storing in the memory the identity of the at least one other transportation units;
  transmitting via the communication module its identity and the stored identity of the at least one other transportation unit to an external processing unit; and
  clustering, at the external processing unit, the transportation units based on the transmitted identities.

The method addresses and makes use of the situation where many transportation units, also referred to as IoT devices, are loaded in a confined space in which the transportation units have different or limited connectivity capabilities depending on radio environment and possibly also on device hardware capabilities. The inventive method takes advantage of the fact that all transportation units, or IoT devices, are roughly at the same location and are able to share information between each other, through local connectivity like Bluetooth LE, to complete each other's limitations.

By configuring the transportation units to share and receive the identities among them, it is possible to later on determine a cluster of units which have been transported together. This information of a cluster of units which have been transported together may be used to provide additional information which each unit is not capable of providing. It may e.g. be that a certain transportation unit is provided with a temperature sensor in order to make sure that the goods has not been subjected to a temperature damaging the goods. This may e.g. be the case when the goods is frozen food or the like. By using the sensor data from this transportation unit together with information about the cluster it has belonged (or still belongs) to, it is possible to determine that the other transportation units have probably also been subjected to this temperature. This way is it e.g. possible to take into account that a temperature sensor of a neighbouring transportation unit is not working correctly.

The method may in short be said to comprise:
  respective transportation unit
  sharing its identity;
  receiving and storing the identity of at least one other transportation unit;
  transmitting its identity and the stored identity of the at least one other transportation unit to an external processing unit; and
  clustering, at the external processing unit, the transportation units based on the transmitted identities.

The respective transportation unit may share its identity and receive the identity of the at least one other transportation unit through a short-range communication protocol supported by the communication module of respective transportation unit. The short-range communication protocol may also be referred to as a local connectivity protocol. By using a short-range or local connectivity is it possible to provide the connectivity relatively frequently, such as every minute, and still accomplish this connectivity with low power requirements. Moreover, since the transportation units may collectively provide sensor data, which then may be associated with all the units in the cluster, it is possible to provide each transportation unit with only the sensors that are considered critical for the transportation capability. Moreover, it is not that necessary to provide redundancy, since there is a great likelihood that data from a faulty sensor may be replaced by data from a working sensor in a neighbouring transportation unit. This also reduces the need for power. Moreover, since there is basically only a need to provide information concerning the identity, the time to transmit the data may be kept at a minimum, such as during a second or so, according to a desired interval, such as every minute or so. This will in return also mean that the time to receive data is kept at a minimum.

The different devices or transportation units will preferably only share their identities through short-range communication or local connectivity protocols like Bluetooth, Bluetooth LE, Wi-Fi or Zigbee. Transmission of device identities can e.g. be performed using Bluetooth LE Advertisements containing a GUID (Globally Unique Identifier) for each device. The communication to the central computing facility may be performed using short-range or local connectivity or long range connectivity, such as UMTS (Universal Mobile Telecommunications System), 3GPP LTE (3rd Generation Partnership Project Long Term Evolution), LTE (Long Term Evolution)-Advanced sometimes referred to as 4G, 5G, etc. The long range connectivity may also be referred to as connectivity capable of connecting to the mobile phone systems.

Short-range or local connectivity, such as Bluetooth or Wi-Fi is the preferred protocol when available because it has significantly lower power consumption compared with long range connectivity, such as 5G.

It may be noted that the transportation units are not intended to be clustered by being gathered into fixed or predetermined transportation groups. On the contrary, a strength of the method is that the units that happens to be gathered, e.g. in a lorry, may as long as they are gathered and not having long range connectivity share and store identities of each other. When a transportation unit is removed from the lorry and it loses its short range connectivity with the other transportation units, that unit no longer forms part of the transportation group. By using local connectivity having a short range the local connectivity may as such be used as indicator that the units connected to each other using this local connectivity are gathered in a transportation group.

The configuring may comprise configuring each transportation unit to share its identity, and to receive and store the others respective identity as a function of time. This it is possible to make a dynamic clustering. During a first period in time, a specific transportation unit may have been transported together with a first group of transportation units and during another period in time the composition of the group may be completely or at least partly different. By keeping track of the identities as a function of time it is possible to provide data concerning which units were transported together during which periods in time.

At least one of the transportation units may further comprise a sensor for determination of a physical property, the method further comprises configuring the transportation unit to store sensor data. This way it is possible to keep track of data concerning the environment to which the goods in the transportation unit has been subjected to or concerning the status of the goods in the transportation unit. The sensor data may be detailed data, such as actual temperature measurement. The sensor data may be related to reaching a limit or not, such as reaching an unacceptable high temperature.

The method may further comprise configuring the transportation unit to store sensor data as a function of time. Thereby it is possible to e.g. determine during how long time a certain circumstance, such as a temperature, has prevailed. The actual data over time may also be provided.

The notion "as a function of time" may e.g. entail having synchronized time between transportation units thereby facilitating the definition of clusters (in time) and corresponding sensor data (in time). This may e.g. be accomplished by using a real time clock (RTC) in each transportation unit. As an alternative you can just have the ordering of the events, but it makes it more cumbersome to make a correct clustering. As an alternative to having an RTC in every transpiration unit one could share the time between units. For instance, by having have timed associations from one unit and only ordered associations in another unit it is possible to derive time from the order of association and thereby derive sensor data from the other device with no time information.

The configuring may comprise configuring each transportation unit to share its identity, and to receive and store the others respective identity in response to the transportation unit loosing long range connectivity and/or in response to another transportation unit sharing its identity through a local connectivity protocol. This way it is possible to provide an automatic initiation of sharing information for later clustering. If the unit itself losses its long range connectivity it is desired for that unit that it and its neighbours starts sharing and storing identities for later clustering. If the unit receives an identity shared by another unit, it may thereby realise that the neighbouring unit has lost long range connectivity and it is for that reason desired that the unit that it and its neighbours starts sharing and storing identities for later clustering.

The configuring may comprise configuring each transportation unit to communicate its identity and the stored identity or identities of the one or more other transportation units to an external processing unit, such as a central computing facility, in response to regained long range connectivity. The long range connectivity may be a direct long range connectivity, such as 5G connectivity. The long range connectivity may also be a local connectivity which is relayed as a long range connectivity. This may e.g. be the case if the unit regains Wi-Fi connectivity with a device capable of relaying the data onto the internet. By automatically sending the data in response to detection of regained long range connectivity, it is possible to as soon as possible receive data relevant for the respective transportation unit in the cluster.

The configuring may comprise configuring each transportation unit to communicate its identity and the stored identity or identities of the one or more other transportation units to a computing device in response to a request from the computing device connecting to the transportation unit through a local connectivity protocol or through a long range connectivity. This computing device may the external processing unit referred to above, This way it is possible to provide a dedicated request for data when a user or a computing device is prepared to receive and make use of the data.

The above object has also been achieved by a transportation unit comprising a communication module and a memory, wherein the transportation unit is configured to share its identity to other transportation units through a connectivity protocol, preferably a short range communication or local connectivity protocol, supported by the communication module, to receive, via the communication module, and to store in the memory the identity of at least one other transportation units shared by the at least one other transportation unit through a connectivity protocol, preferably a short range communication or local connectivity protocol, and to transmit, via the communication module, its identity and the stored identity or identities of the one or more other transportation units to a central computing facility.

With a transportation unit of this kind, it is possible to provide and collect data which may be used in a central computing facility to provide a clustering. The advantages of this clustering has been discussed in detail above and reference is made to that discussion. Likewise, the advantages of the different preferred features introduced in the following has also been discussed in relation to the corresponding features of the method and reference is made to that discussion.

The transportation unit may further be configured to share its identity, and to receive and store the others respective identity as a function of time.

The transportation unit may further comprise a sensor for determination of a physical property, wherein the transportation unit is configured to store sensor data, preferably to store sensor data as a function of time.

The transportation unit may be configured to share its identity, and to receive and store the others respective identity in response to the transportation unit loosing long range connectivity and/or in response to another transportation unit sharing its identity through a local connectivity protocol.

The transportation unit may be configured to communicate its identity and the stored identity or identities of the one or more other transportation units to an external processing unit in response to regained long range connectivity.

The transportation unit may be configured to communicate its identity and the stored identity or identities of the one or more other transportation units to a computing device in response to a request from the computing device connecting to the transportation unit through a local connectivity protocol or through a long range connectivity.

The above object has also been achieved by a computer program product stored on a non-transitory memory which when run on a computing device of a transportation unit performs the steps of:

sharing an identity of the transportation unit to other transportation units through a connectivity protocol, preferably short range communication or local connectivity protocol, supported by a communication module of the transportation unit, receiving, via the communication module, and storing, in a memory of the transportation unit, the identity of at least one other transportation unit shared by the at least one other transportation unit through a connectivity protocol, preferably a short range communication or local connectivity protocol, and transmitting, via the communication module, the identity of the transportation unit and the stored identity of the at least one other transportation unit to an external processing unit.

The above object has also been achieved by a computer program product stored on a non-transitory memory which when run on an external processing unit, such as a computing device of a computing facility, remote from a transportation unit performs the steps of:

receiving from a transportation unit an identity of the transportation unit and at least one stored identity of at least one other transportation unit which has shared its identity to the transportation unit, and clustering, at the external processing unit, the transportation units based on the received identities.

BRIEF DESCRIPTION OF THE DRAWINGS

The invention will by way of example be described in more detail with reference to the appended schematic drawings, which shows a presently preferred embodiment of the invention.

FIG. 2 discloses a set of tables indicating data stored in respective memory of respective transportation unit and a table indicating the data retrievable by using the inventive method.

DETAILED DESCRIPTION OF PREFERRED EMBODIMENTS

Figure 1:
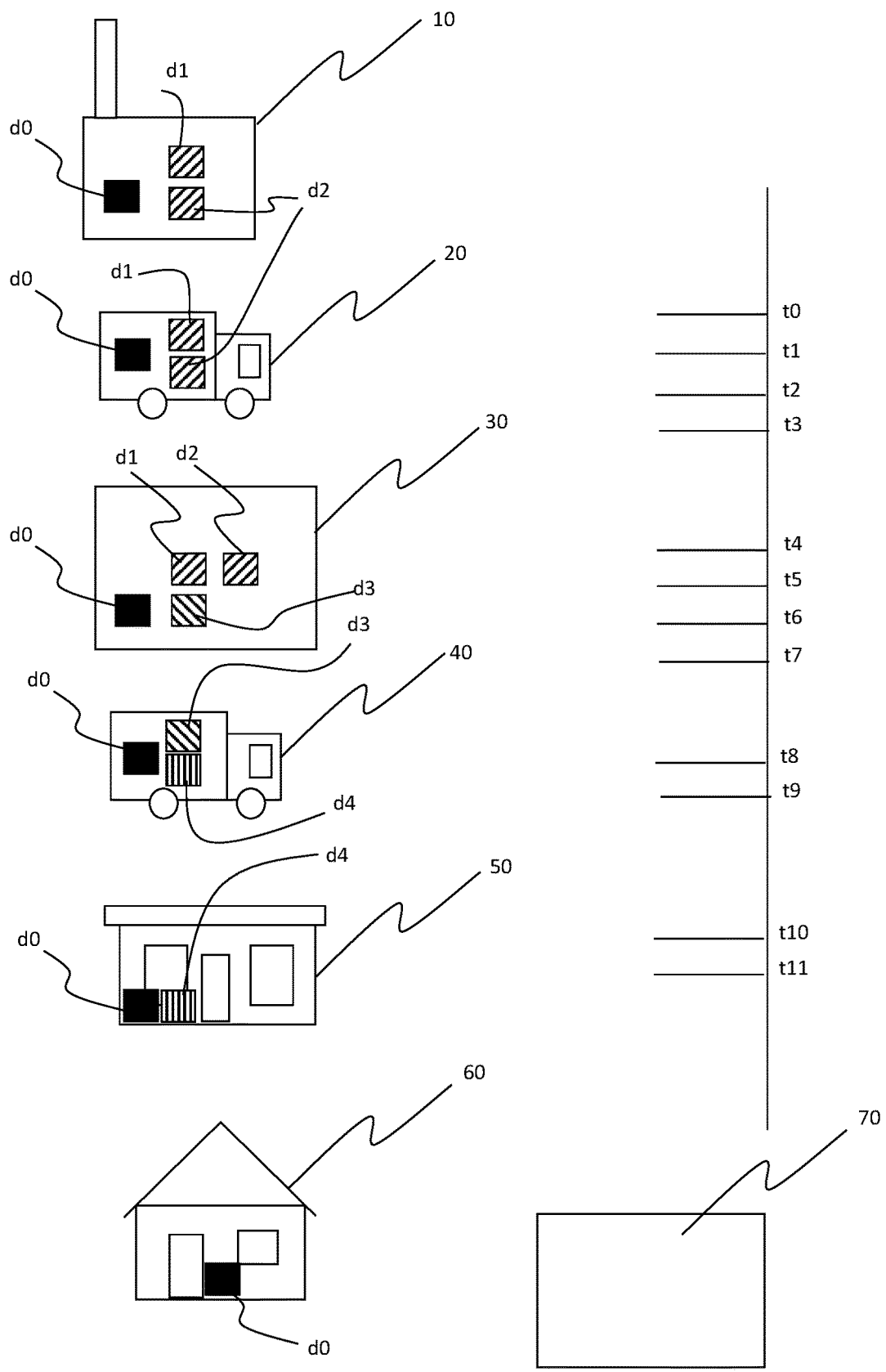
FIG. 1 schematically depicts a distribution chain in which inventive transportation units may be used. To the right in FIG. 1 there is a schematic time line.

FIG. 1 generally depicts an example of a manufacturing and distribution chain. In the example of FIG. 1, the chain comprises a manufacturing or assembly site 10. The goods are packed into or associated with transportation units d0, d1, d2. The transportation units d0, d1, d2 may be trays, pallets, boxes or other kinds of transportation entities useful to collect and/or protect goods during transport. The transportation units d0, d1, d2 also comprises electronic circuitry which will be disclosed in more detail below. The transportation units d0, d1, d2 may also be separate electronic devices which are associated with ordinary trays, pallets, boxes or other kinds of ordinary transportation entities. The association of the transportation units d0, d1, d2 with the transportation entities may e.g. be attachment of the electronic devices e.g. to a pallet, a tray or other kinds of transportation entities. The association need not be attachment; it can also be placement of the electronic device together with the goods to be distributed, such as placement of the electronic device inside a box or tray. Any kind of association by which the electronic device may be distributed together with the same piece of goods for a relevant part of the distribution provides a basis for a tracing capability as will be disclosed in detail below. In the following the transportation units d0, d1, d2 will be discussed in detail according to an example in which the transportation units d0, d1, d2 are trays in which pieces of goods are packed.

The trays d0, d1, d2 are transported from the site 10. This transport is schematically disclosed as a lorry 20, but may be any kind of transport, such as by road, air, railway, sea, river, etc. The transport 20 transports the trays d0, d1, d2 e.g. to a warehouse 30. The trays d0, d1, d2 may all be dropped off at the warehouse 30 in which the will stored together with other pieces of goods of which some may be packaged in trays d3 of the kind discussed above.

Some of the trays d0, d3 may be transported from the warehouse 30 by a transport 40. In the transport 40 there may be other trays d4 of the kind discussed above.

The transport 40 drops of some of the trays d0, d4 e.g. at a grocery 50. The customer buys the goods and transport the goods to its home 60.

In the example shown in FIG. 1, a transportation unit d0 is followed through the example distribution chain.

Figure 4:
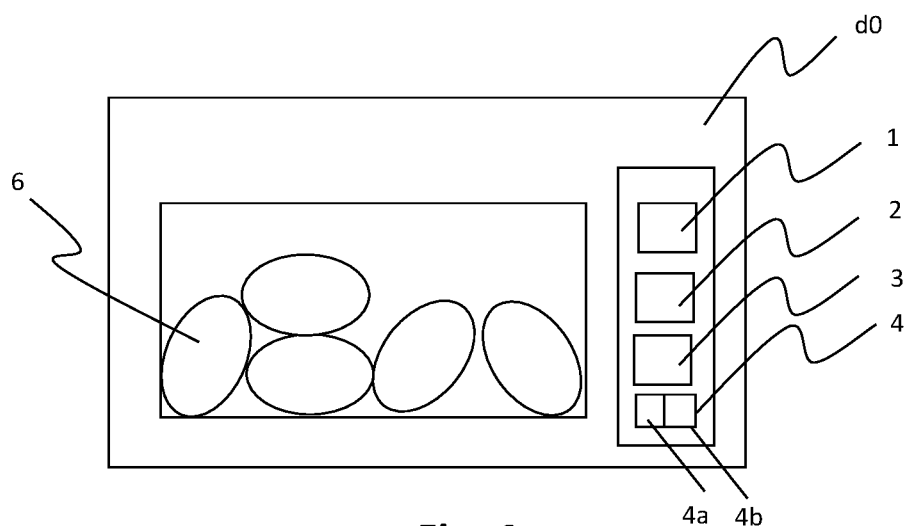
FIG. 4 schematically depicts a transportation unit.

The components and functions of the transportation units d0, d1, d2, d3, d4 will be disclosed in detail in accordance with an example transportation unit d0 shown in FIG. 4. The transportation unit d0 comprises a communication module 1 and a memory 2. The transportation unit d0 also comprises a computing device or module 3. It may be noted that the transportation units d0, d1, d2, d3, d4 need not be identical.

Each transportation unit d0, d1, d2, d3, d4 is configured to share its identity to other transportation units d0, d1, d2, d3, d4 through a local connectivity protocol supported by the communication module 1.

Each transportation unit d0, d1, d2, d3, d4 is also configured to receive, via the communication module 1, and to store in the memory 2 the respective identity of one or more other transportation units d0, d1, d2, d3, d4 shared by the one or more other transportation units d0, d1, d2, d3, d4 through a local connectivity protocol.

It may be noted that the local connectivity protocol used for sharing and receiving may not be the same protocol if the communication module 1 of the respective transportation unit d0, d1, d2, d3, d4 supports more than one local connectivity protocol. However, it is preferred that the transportation units d0, d1, d2, d3, d4 are configured to use the same local connectivity protocol.

Each transportation unit d0, d1, d2, d3, d4 is also configured to communicate, via the communication module 1, its identity and the stored identity or identities of the one or more other transportation units d0, d1, d2, d3, d4 to a central computing facility 70.

The transportation unit d0, d1, d2, d3, d4 is further configured to share its identity, and to receive and store the others respective identity as a function of time. A schematic time line is indicated to the right in FIG. 1.

The transportation unit d0, d1, d2, d3, d4 further comprises a sensor 4 for determination of a physical property, wherein the transportation unit is configured to store sensor data, preferably to store sensor data as a function of time.

The physical property may e.g. be humidity, temperature, vibrations, etc. In the example shown in FIG. 4, the transportation unit d0, d1, d2, d3, d4 comprises two sensors 4a, 4b. The transportation unit d0 may e.g. be an insulated box in which goods 6, such as frozen food, is transported. The sensors 4a and 4b may e.g. be temperature sensors with one sensor 4a detecting the temperature inside the box and the other sensor 4b detecting the temperature outside the box. Thereby it may be determined using the sensor 4b if the box has been stored and transported while being cooled all the time. The sensor 4a may be used to determine if the actual temperature inside the box has been sufficiently low all the time during storing and transport.

The transportation unit d0, d1, d2, d3 d4 may be configured to start sharing its identity, and to receive and store the other transportation units d1, d2, d3, d4 respective identity in response to the transportation unit d0 loosing long range connectivity and/or in response to another transportation unit d1, d2, d3, d4 sharing its identity through a local connectivity protocol. If all transportation units d0, d2, d3, d4 are configured this way, the sharing will begin as soon as one of the transportation units d0, d1, d2, d3, d4 loses long range connectivity.

The transportation unit d0, d1, d2, d3, d4 is configured to communicate its identity and the stored identity or identities of the one or more other transportation units to a central computing facility 70 in response to regained long range connectivity.

The transportation unit d0, d1, d2, d3, d4 is configured to communicate its identity and the stored identity or identities of the one or more other transportation units to a computing device 70 in response to a request from the computing device 70 connecting to the transportation unit d0, d1 d2, d3, d4 through a local connectivity protocol or through a long range connectivity.

The above sharing, receiving and storing as a function of time will result in different data stored in the respective memory 2 of respective transportation unit d0, d1, d2, d3, d4.

The data is shown in the five tables given the identifiers d0, d1, d2, d3 and d4, respectively in the top left box of respective table.

The sensor data from the sensors 4a, 4b is only indicated by Y or N indicating if there is sensor data available or not. Sensor data may e.g. be not available due to a specific transportation unit not being provided with a sensor of a specific kind or due to a faulty sensor. It may be noted that respective transportation unit stores in its memory data concerning its sensors. Using the method that will be disclosed in more detail below makes it non-relevant to store sensor data from other transportation units. It is also common that if a specific transportation unit does not support a specific sensor it may not be capable of storing relevant sensor data in respect of such a sensor.

With reference to FIG. 1, the case may initially be that in the site 10 the transportation units d0, d1, d2 have long range connectivity to a central computing device 70 and therefore they are not running the sharing, receiving and storing identities steps. The sensor data from the sensors may be stored or may be transmitted when so is desired to the central computing device 70.

However, when the transportation units d0, d1, d2 are loaded on the lorry 20 at least one of them loses in this example long range connectivity and begins to share its identity. In response to this all of the transportation units d0, d1, d2 in the lorry 20 will begin to share, receive and store the identities of the other transportation units d0, d1, d2 in the lorry 20. These instances are stored in the tables d0, d1, d2 under the times t0, t1, t2, t3.

In the example this sharing, receiving and storing is assumed to continue during the distribution chain also over the times t4 to t11. In practice however the distribution chain is typically set up such that the transportation units e.g. regain long range connectivity now and then; e.g. in the warehouse 30.

As is shown in the different tables d0, d1, d2, d3, d4 in FIG. 2, the different identities will begin to be stored in the other's memories when they are temporarily gathered with the group or cluster. It may be noted that this grouping or clustering is in the example solely based on us following the transportation unit named d0.

In the example the unit d3 is delivered to the warehouse 30 at time instance t6. From that point the identity d3 begins to be stored in the memories of the d0, d1, d2 units.

Similarly, unit d4 is introduced at time instance t8. The units d1 and d2 are not loaded on the same lorry 40 as unit d0 and therefore their identities will no longer be received and stored in the memory of unit d0.

In the example it is shown that unit d0 does have a sensor of kind S1 but no sensor of kind S2. However, in the example it is also shown a case where the sensor S1 stops working at time instance t5.

In the example it is assumed that the unit d0 regains long range connectivity soon after time instance t11.

As mentioned above, the transportation unit d0 is configured to communicate its identity and a stored identity or stored identities of one or more other transportation units which has/have communicated its/their identity/identities to the transportation unit. Thus, the transportation unit d0 will communicate the table d0 to the central computing facility 70.

The central computing facility 70 is configured to receiving from respective transportation unit an identity of the transportation unit and a stored identity or stored identities of one or more other transportation units which has/have communicated its/their identity/identities to the transportation unit, and determining, at the central computing facility, a clustering of the transportation units based on the communicated identities.

The result of the clustering is shown in the clustering table at the bottom right of FIG. 2.

If all the transportation units d0, d1, d2, d3, d4 have been able to regain long range connectivity the clustering may also check if sensor data of various kinds is available from one or more of the transportation units d0, d1, d2, d3, d4.

As shown in the clustering table the clustering at the central computing facility 70 provides information that although the sensor S1 of unit d0 failed at time t5 there is sensor data of kind S1 available for all time instances t0 to t11. Unit d0 itself provides explicit data for times t0 to t4. S1 data from unit d1 or unit d2 may e.g. be used for times from t5 to t7 as indirect data. S1 data from unit d4 may e.g. be used for times from t8 to t11 as indirect data. Similarly, is it possible to retrieve data related to a sensor of kind S2 for all times from t0 to t11 indirectly although the unit d0 does not have this kind of sensor S2 at all. From times t0 to t7 may information be retrieved from unit d1 and from times t8 to t11 from unit d4.

The central computing facility 70 comprises a non-transitory memory on which a computer program product is stored. When the computer program product is run on a computing device of the computing facility 70 it performs the steps of:

receiving from a transportation unit an identity of the transportation unit and a stored identity or stored identities of one or more other transportation units which has/have communicated its/their identity/identities to the transportation unit, and determining, at the central computing facility, a clustering of the transportation units based on the communicated identities.

It may be mentioned that the central computing facility 70 typically is remote from the transportation units d0, d1, d2, d3, d4.

On a non-transitory memory of each transportation unit there is stored a computer program product. When the computer program product is run on a computing device of the transportation unit it performs the steps of sharing an identity of the transportation unit to other transportation units through a local connectivity protocol supported by a communication module of the transportation unit, receiving, via the communication module, and storing, in a memory of the transportation unit, the respective identity of one or more other transportation units shared by the one or more other transportation units through a local connectivity protocol, and communicating, via the communication module, the identity of the transportation unit and the stored identity or identities of the one or more other transportation units to a central computing facility.

It may also be noted that considering the transportation units and the central computing facility as a system, they together performs a method for providing tracking capabilities in a distribution chain, the method comprising:

providing a plurality of transportation units adapted to be gathered into one or more transportation groups, wherein each transportation unit comprises a communication module and a memory, configuring each transportation unit
to share its identity to other transportation units through a local connectivity protocol supported by the communication module,
to receive via the communication module and to store in the memory the respective identity of one or more other transportation units shared by the one or more other transportation units through a local connectivity protocol, and
to communicate, via the communication module, its identity and the stored identity or identities of the one or more other transportation units to a central computing facility, determining, at the central computing facility, a clustering of the transportation units based on the communicated identities.

Figure 3:
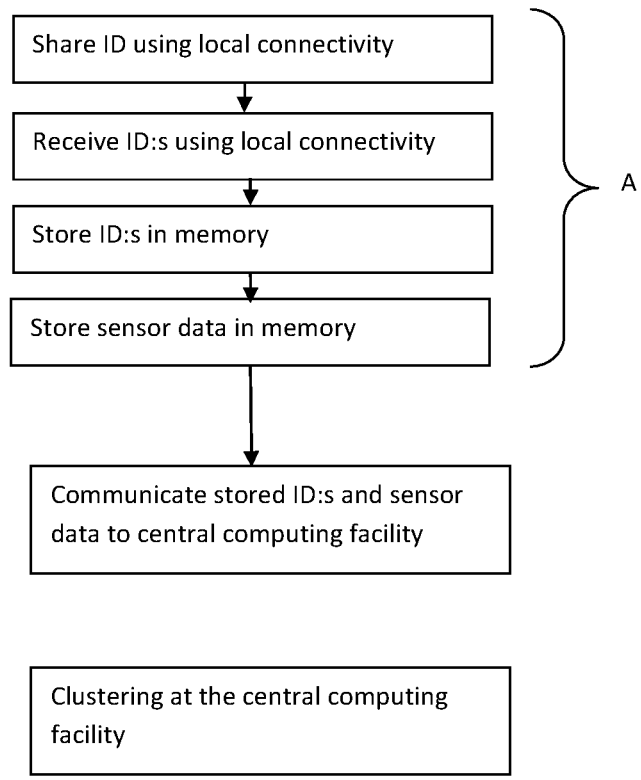
FIG. 3 schematically depicts a flowchart of the method and the computer programs.

In FIG. 3, the method steps indicated by A is performed in each transportation unit during periods where the units are gathered in a transportation group and shares their identities to each other using local connectivity and store the other transportation units' identities as a function of time.

Once they regain long range connectivity, the transportation units will communicate their identities and stored data as a function of time.

The central computing facility has received data from the transportation units, it will perform a clustering to establish which transportation units has been gathered at the same location at which time instances.

It is contemplated that there are numerous modifications of the embodiments described herein, which are still within the scope of the invention as defined by the appended claims.

The transportation unit may for instance be self-contained unit which is attached to a tray, pallet, box or other kinds of transportation entities.

The invention claimed is:

1. A method for clustering transportation units in a distribution chain, the method comprising:
   providing a plurality of transportation units, wherein each transportation unit comprises a communication module and a memory;
   the method further comprising providing a respective transportation unit to:
      share the identity of the transportation unit via the communication module;
      receive, via the communication module, the identity of at least one other transportation unit;
      store in the memory the identity of the at least one other transportation unit; and transmit via the communication module the identity of the transportation unit and the stored identity of the at least one other transportation unit to an external processing unit; and clustering, at the external processing unit, the transportation units based on the transmitted identities.

2. The method according to claim 1, wherein the respective transportation unit shares the identity of the transportation unit and receives the identity of the at least one other transportation unit through a short-range communication protocol supported by the communication module of the respective transportation unit.

3. The method according to claim 1, wherein the respective transportation unit shares the identity of the transportation unit, and receives and stores the identity of the at least one other transportation unit as a function of time.

4. The method according to claim 1, wherein at least one of the transportation units further comprises a sensor for determination of a physical property.

5. The method according to claim 4, wherein the method further comprises the transportation unit to store sensor data as a function of time.

6. The method according to claim 1, wherein the respective transportation unit shares the identity of the transportation unit, and receives and stores the identity of the at least one other transportation unit in response to the transportation unit loosing long-range communication connectivity and/or in response to another transportation unit sharing the identity of the transportation unit through a short-range communication protocol.

7. The method according to claim 1, wherein the respective transportation unit transmits the identity of the transportation unit and the stored identity of the at least one other transportation unit to the external processing unit in response to regained long-range communication connectivity.

8. The method according to claim 1, wherein the respective transportation unit transmits the identity of the transportation unit and the stored identity of the at least one other transportation unit to the external processing unit in response to a request from the external processing unit connecting to the transportation unit through a short-range communication protocol or through a long-range communication connectivity.

9. A transportation unit comprising a communication module and a memory, wherein the transportation unit is configured:

to share the identity of the transportation unit to other transportation units by the communication module;

to receive, via the communication module, and to store in the memory the identity of at least one other transportation units shared by the at least one other transportation unit; and to transmit, via the communication module, the identity of the transportation unit and the stored identity of the at least one other transportation units to an external processing unit.

10. The transportation unit according to claim 9, wherein the transportation unit is further configured to share the identity of the transportation unit, and to receive and store the other transportation units' respective identities as a function of time.

11. The transportation unit according to claim 9, wherein the transportation unit further comprises a sensor for determination of a physicalproperty, wherein the transportation unit is configured to store sensor data, preferably to store sensor data as a function of time.

12. The transportation unit according to claim 9, wherein the transportation unit is configured to share the identity of the transportation unit, and to receive and store the others respective identity in response to the transportation unit loosing long-range communication connectivity and/or in response to another transportation unit sharing the identity of the transportation unit through a short-range communication protocol.

13. The transportation unit according to claim 9, wherein the transportation unit is configured to communicate its identity and the stored identity or identities of the one or more other transportation units to an external processing unit in response to regained long range connectivity.

14. A non-transitory computer readable memory storing a computer program product, which product, when executed on a computing device of a transportation unit, performs the steps of:

sharing an identity of the transportation unit to other transportation units through a connectivity protocol, preferably a short-range communication protocol, supported by a communication module of the transportation unit;

receiving, via the communication module, and storing, in a memory of the transportation unit, the identity of at least one other transportation unit shared by the at least one other transportation unit through a connectivity protocol, preferably a short-range communication protocol, and transmitting, via the communication module, the identity of the transportation unit and the stored identity of the at least one other transportation units to an external processing unit.

* * * * *